Jan. 20, 1970   C. K. HUTCHINS, JR   3,490,594

FILTER

Filed Nov. 21, 1968   2 Sheets-Sheet 1

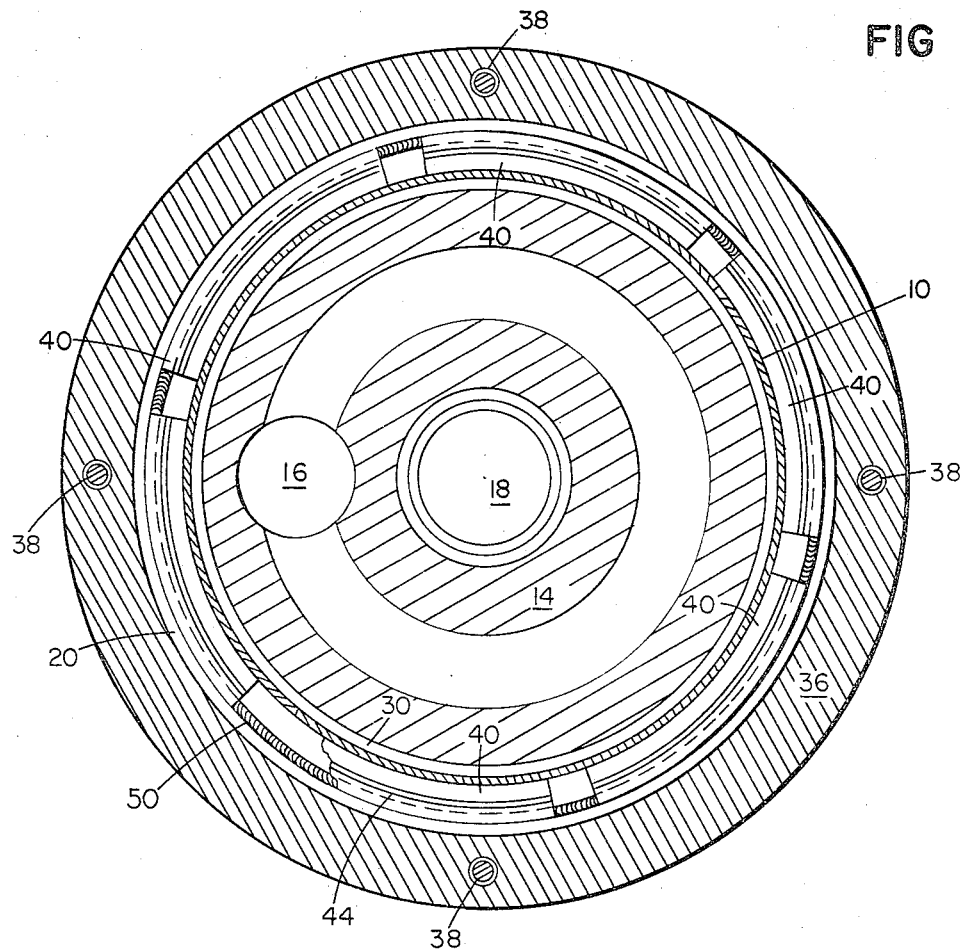

United States Patent Office 3,490,594
Patented Jan. 20, 1970

3,490,594
FILTER
Charles K. Hutchins, Jr., Cranston, R.I., assignor to Fram Corporation, East Providence, R.I., a corporation of Delaware
Filed Nov. 21, 1968, Ser. No. 777,591
Int. Cl. B01d 25/02, 25/00
U.S. Cl. 210—232                                9 Claims

ABSTRACT OF THE DISCLOSURE

A filter assembly in which a filter element is mounted in a sealed housing. The housing is mounted in a base having a plurality of spring loaded clamping jaws contained in a recess in the base, the jaws and the recess having cooperating oblique surfaces which act to transform a portion of the pressure within the filter assembly into an increased radial clamping force.

This invention relates to filter assemblies in which a filter element is mounted in a sealed housing.

Objects of the invention are to provide such an assembly of simple and inexpensive construction in which the filter element can easily be installed in and removed from the housing, and yet the housing remains reliably sealed over a broad range of internal pressures.

The invention features a filter assembly comprising a base; a housing within which a filter element is disposed, the housing having a shoulder adjacent its periphery and the base having a recess to admit this shoulder across a plane, the recess having a surface facing obliquely away from the plane and inwardly of the base; and a plurality of clamping jaws disposed in the recess, each jaw being resiliently biased toward the shoulder and having a clamping portion between the plane and the shoulder and an oblique surface adjacent the oblique surface of the recess. In preferred embodiments the clamping portion of the jaw is directed toward the housing and the jaw is relieved adjacent the clamping portion to admit the shoulder of the housing; the jaw is relieved adjacent the clamping portion to facilitate insertion of the shoulder into the recess; the oblique surface of the recess is provided by at least one annular block removably mounted on the base; the resilient biasing is provided by a garter spring disposed about the surfaces of the jaws which face away from the housing; the oblique surface of the jaw is parallel to the oblique surface of the recess; and a removal tool is provided with an inner diameter slightly larger than the outer diameter of the filter housing, whereby the tool may be fitted over the housing to force the clamping jaws away from the shoulder of the housing.

Other objects, features, and advantages will appear from the following description of a preferred embodiment of the invention, taken together with the attached drawings thereof, in which:

FIG. 3 is a view taken at 3—3 of FIG. 1.

Figure 1:
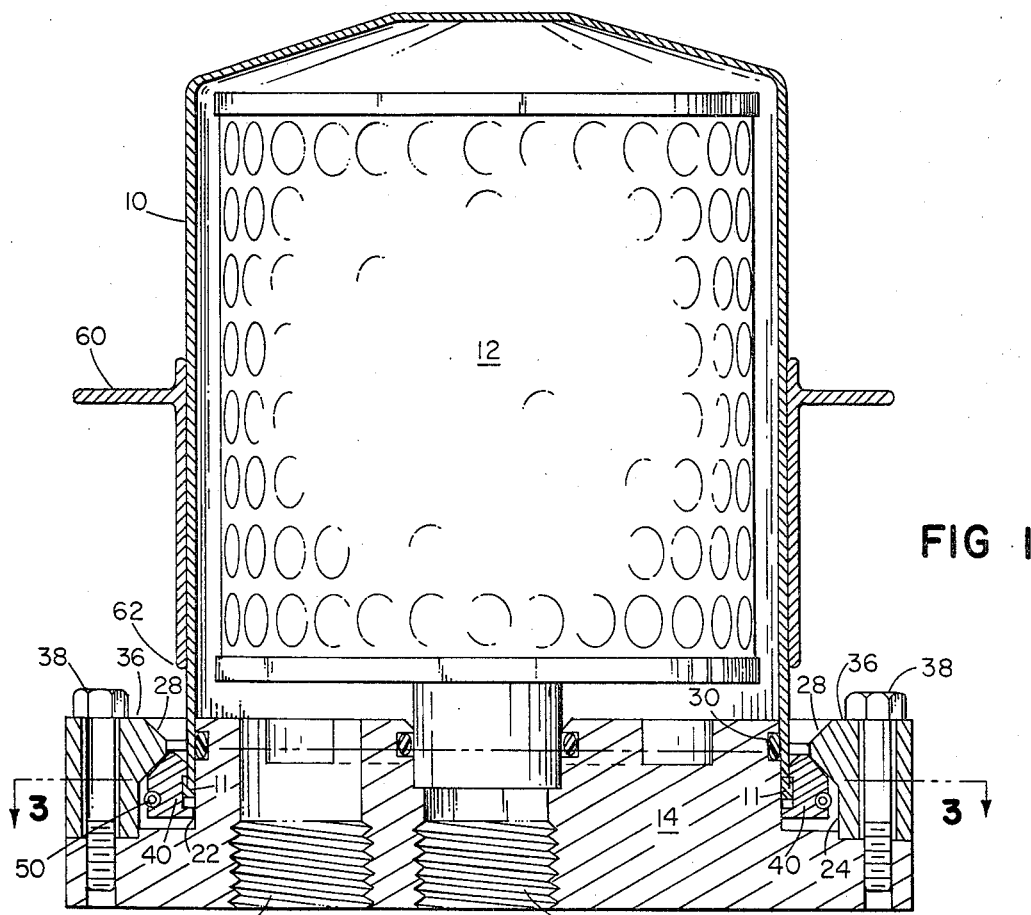
FIG. 1 is a longitudinal section of a filter assembly constructed according to the invention.
Figure 2:
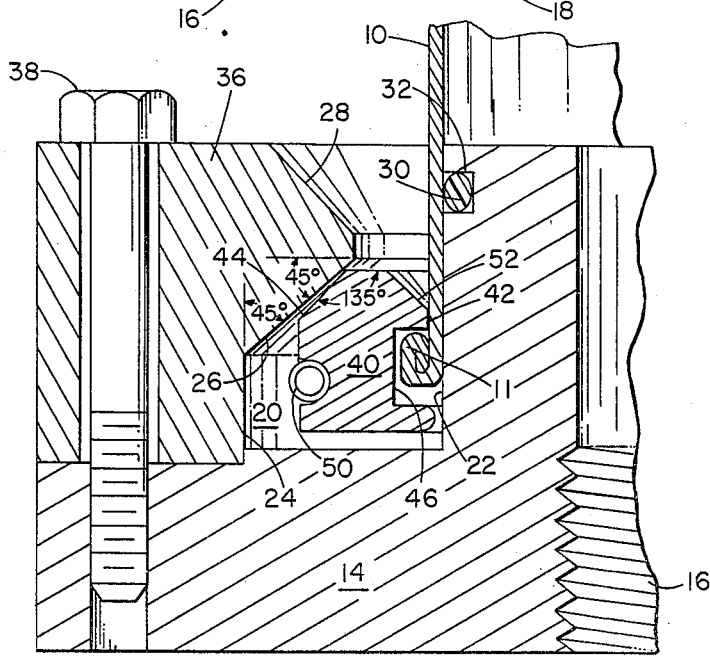
FIG. 2 is an enlarged view of a portion of FIG. 1.

There is shown in FIG. 1 a generally cylindrical filter housing 10 with a rolled bottom shoulder 11 mounted in a disc shaped base 14 and containing a replaceable filter element 12. Base 14 has inlet port 16 and an axial outlet port 18. The filter is constructed, in a manner well known in the art, so that fluid entering via the inlet port must pass through the filter element 12 in order to reach the outlet port 18.

Base 14 has a generally annular groove 20 providing inner cylindrical wall 22 of a diameter slightly less than the inside diameter of housing 10, an outer cylindrical wall 24, wall 26 sloping upwardly toward wall 22 at approximately 45° to the plane of wall 24, and wall 28 sloping upwardly and outwardly. Walls 24, 26, and 28 are provided by annular block 36 bolted to the base 14 proper by bolts 38. Resilient O-ring 30 is mounted in recess 32 in wall 22. Six arcuate jaws 40 fit end-to-end in groove 20. Each jaw has a vertical clamping surface 42, a sloping surface 44 parallel to wall 26, and, below surface 42, a recess 46 of rectangular cross section larger than that of shoulder 11. Garter spring 50 surrounds jaws 40 and forces them radially inwardly. The jaws are relieved above surfaces 42 at 52.

In operation, as the filter housing 10 is pushed down against jaws 40, each jaw deflects against the pressure spring 50 until shoulder 11 drops behind the clamping surface 42 into recess 46. The housing 10 is now sealed to base 14 by virtue of the resilient O-ring 30. If pressure builds up within the filter, shoulder 11 lifts the jaws 40, thereby forcing the sloping surface 44 on each jaw against the adjacent wall 26 of the groove 20. A portion of this vertical force on the jaws is transformed into a radial clamping force by the interaction of these cooperating oblique surfaces of the groove and the jaws. The clamping action, therefore, is "self-activating" in that increased pressure in the filter will cause a corresponding increase in radial clamping force.

Removal of the filter housing 10 from base 14, for replacement of filter element 12, is easily accomplished by relieving the internal pressure in the filter and then sliding sleeve-shaped tool 60 (see FIG. 1) over the filter body. The tapered lower edge 62 of tool 60 is pressed against the clamping jaws until the tool makes contact with shoulder 11 on filter housing 10. With the tool thus holding the jaws away from the shoulder 11, the filter housing 10 may be removed from the base 14. The filter assembly is preferably mounted in use with base 14 above housing 10, so that upon removal of the housing after a period of use free oil will not be spilled.

What is claimed is:

1. A filter assembly comprising
   a base;
   a housing within which a filter element is disposed,
      said housing having a shoulder adjacent its periphery,
      said base having a recess to admit said shoulder across a plane,
      said recess having a surface facing obliquely away from said plane and inwardly of the base; and
   a plurality of clamping jaws disposed in said recess, each said jaw being resiliently biased toward said shoulder and having a clamping portion between said plane and said shoulder and an oblique surface adjacent said surface of said recess.

2. The filter assembly of claim 1 wherein said clamping portion is a surface facing said housing and said jaw is relieved adjacent said clamping surface to admit said shoulder.

3. The filter assembly of claim 1 wherein said jaw is relieved adjacent said clamping portion to facilitate insertion of said shoulder into said recess.

4. The filter assembly of claim 1 wherein said surface of said recess is provided by at least one annular block removably mounted in said base.

5. The filter assembly of claim 1 wherein said resilient biasing is provided by a garter spring disposed about the surfaces of said jaws facing away from said housing.

6. The filter assembly of claim 1 wherein said oblique surface of said jaw and said surface of said recess are parallel.

7. The filter assembly of claim 3 wherein
said recess is a generally annular groove providing an inner cylindrical wall of a diameter slightly less than the inside diameter of said housing, an outer cylindrical wall, and a wall sloping toward said inner cylindrical wall at 45° to the plane of said outer cylindrical wall, said inner cylindrical wall having a recess with a resilient O-ring mounted therein;
said clamping portion is a surface directed toward said housing and is parallel to said inner cylindrical wall provided by said annular groove;
said relief adjacent said clamping portion is of generally rectangular cross-section with both dimensions larger than the corresponding dimensions of said shoulder;
said resilient biasing is provided by a garter spring disposed about the surfaces of said jaws directed away from said housing;
said oblique surface of said jaw and said surface of said recess are parallel; and
said jaw is relieved adjacent said clamping portion to facilitate insertion of said shoulder into said recess.

8. The combination of the filter assembly of claim 1 with a removal tool having an inner diameter slightly larger than the outer diameter of said filter housing, whereby said tool may be fitted over said housing to force said clamping jaws away from said shoulder.

9. A filter assembly comprising
a base;
a housing within which a filter element is disposed,
said housing having a shoulder adjacent one end,
said base having a recess to admit said shoulder across a plane,
said recess having a jaw-retaining surface facing generally away from said plane; and
a plurality of clamping jaws disposed in said recess;
each said jaw having a clamping portion between said plane and said shoulder, and a surface adjacent said jaw-retaining surface,
each said jaw being movable between a first position in which said clamping portion is directly adjacent said shoulder to retain said housing in said base, and a second position in which said clamping portion is spaced from said housing to allow passage of said shoulder across said plane.

References Cited

UNITED STATES PATENTS 3,399,776    9/1968    Itnuth   ------------- 210—444

REUBEN FRIEDMAN, Primary Examiner

T. A. GRANGER, Assistant Examiner

U.S. Cl. X.R.

210—444